(12) United States Patent
Bacher et al.

(10) Patent No.: US 10,638,763 B2
(45) Date of Patent: May 5, 2020

(54) BREAD LAME

(71) Applicant: MASONTOPS, INC., Toronto (CA)

(72) Inventors: Michael Bacher, Toronto (CA); Philip Baron, Toronto (CA); Brett Molnar, Toronto (CA)

(73) Assignee: MASONTOPS, INC., Toronto (CA)

( * ) Notice: Subject to any disclaimer, the term of this patent is extended or adjusted under 35 U.S.C. 154(b) by 25 days.

(21) Appl. No.: 16/027,868

(22) Filed: Jul. 5, 2018

(65) Prior Publication Data
US 2019/0008168 A1  Jan. 10, 2019

Related U.S. Application Data
(60) Provisional application No. 62/528,637, filed on Jul. 5, 2017.

(51) Int. Cl.
*A21C 11/12* (2006.01)
*B26B 29/02* (2006.01)
*B26B 5/00* (2006.01)

(52) U.S. Cl.
CPC .............. *A21C 11/12* (2013.01); *B26B 5/006* (2013.01); *B26B 29/025* (2013.01)

(58) Field of Classification Search
CPC .................................................. A21C 11/12; B26B 5/00; B26B 5/006; B26B 29/025
USPC .......................................... 30/299, 329–339
See application file for complete search history.

(56) References Cited

U.S. PATENT DOCUMENTS

| | | | | |
|---|---|---|---|---|
| 972,305 A * | 10/1910 | Whittemore | ......... | H02G 1/1224 30/299 |
| 1,038,896 A * | 9/1912 | Jolly | ..................... | B26B 29/025 30/336 |
| 1,134,706 A * | 4/1915 | Somers | ................... | B26B 21/10 30/339 |
| 1,356,799 A * | 10/1920 | Tompson | ............. | B24D 15/105 30/332 |
| 1,558,711 A * | 10/1925 | Nittinger | ............. | B24D 15/105 30/333 |
| 1,587,358 A * | 6/1926 | Arnold et al. | ....... | B24D 15/105 30/334 |
| 1,666,118 A * | 4/1928 | Colgrove | ................ | B26B 5/006 30/333 |

(Continued)

FOREIGN PATENT DOCUMENTS

| DE | 102006017829 B4 * | 9/2012 | ............. A21C 11/12 |
|---|---|---|---|
| FR | 2669508 A1 * | 5/1992 | ............. A21C 11/12 |

(Continued)

OTHER PUBLICATIONS

Int'l Search Report and Written Opinion Appln No. PCT/IB2018/000846 dated Nov. 29, 2018.

*Primary Examiner* — Jason Daniel Prone
(74) *Attorney, Agent, or Firm* — McAndrews, Held & Malloy, Ltd.

(57) ABSTRACT

A lame, for example a bread lame, is provided which may be used to score bread dough. The lame may include blade holders that may securely hold a razor blade in a curved or a straight profile, and may cover one or more corners of the razor blade. The blade holders may be securable to and removable from a handle of the bread lame. The lame may include a removable cover for the blade holders to cover exposed edges of the razor blades.

18 Claims, 9 Drawing Sheets

(56) References Cited

U.S. PATENT DOCUMENTS

| | | | | | |
|---|---|---|---|---|---|
| 1,683,853 | A | * | 9/1928 | White | B24D 15/105 30/333 |
| 1,724,980 | A | * | 8/1929 | Terrell | A47J 17/02 30/331 |
| 1,728,604 | A | * | 9/1929 | Giglio | B24D 15/105 30/333 |
| 1,776,247 | A | * | 9/1930 | Behrman | A61B 17/54 30/278 |
| 1,835,655 | A | * | 12/1931 | Lehmann | B26B 21/10 30/337 |
| 1,885,444 | A | * | 11/1932 | Huber | B24D 15/105 30/334 |
| 2,016,995 | A | * | 10/1935 | Fritz | B24D 15/105 30/338 |
| 2,368,924 | A | * | 2/1945 | Hansen | B24D 15/105 30/332 |
| 2,530,216 | A | * | 11/1950 | Appel | A61B 17/54 30/333 |
| 2,637,904 | A | * | 5/1953 | Springer | B26B 27/00 30/334 |
| 2,736,964 | A | * | 3/1956 | Lieberman | A61B 17/3211 30/336 |
| 2,743,523 | A | * | 5/1956 | Honey | B26B 5/006 30/337 |
| 3,018,499 | A | * | 1/1962 | Levy | E04F 21/04 15/235.4 |
| 3,058,215 | A | * | 10/1962 | Williams | B26B 5/00 30/334 |
| 3,362,069 | A | * | 1/1968 | Blackwell | B26B 5/006 30/329 |
| 3,488,843 | A | * | 1/1970 | Tims, Jr. | B26B 5/00 30/339 |
| 4,019,298 | A | * | 4/1977 | Johnson, IV | E04B 1/185 52/590.1 |
| 4,389,161 | A | * | 6/1983 | Brumen | F01D 5/326 416/220 R |
| 4,620,368 | A | * | 11/1986 | Bowman | B26B 5/005 30/329 |
| 4,821,418 | A | * | 4/1989 | Windhager | B24D 15/105 30/329 |
| 4,916,816 | A | * | 4/1990 | Richman | A21C 11/12 30/339 |
| 5,036,591 | A | * | 8/1991 | Cousins | B26B 1/00 30/330 |
| 5,495,670 | A | * | 3/1996 | Quinn | B26B 5/001 30/335 |
| 5,595,424 | A | * | 1/1997 | Nakagawa | B23D 9/00 30/339 |
| 5,697,157 | A | | 12/1997 | Votolato | |
| 6,418,624 | B1 | * | 7/2002 | Huang | B26B 5/003 30/329 |
| 6,487,948 | B1 | | 12/2002 | Alfi | |
| 6,500,187 | B1 | * | 12/2002 | Petersen | A61B 17/3213 30/329 |
| 6,745,478 | B2 | * | 6/2004 | DeLillo | B26B 5/00 30/335 |
| 7,726,031 | B1 | * | 6/2010 | Gibbs | B26B 5/00 30/335 |
| 8,065,945 | B2 | * | 11/2011 | Kobayashi | A61B 10/02 30/329 |
| 8,793,881 | B2 | * | 8/2014 | Rowlay | B26B 5/001 30/162 |
| 9,393,708 | B2 | * | 7/2016 | Babaev | B26B 27/00 |
| 2003/0084575 | A1 | * | 5/2003 | Chen | B26B 5/001 30/335 |
| 2009/0056145 | A1 | * | 3/2009 | Alfi | A21C 11/12 30/151 |
| 2012/0227267 | A1 | * | 9/2012 | Qiu | B26B 5/00 30/299 |
| 2015/0040406 | A1 | * | 2/2015 | Votolato | B26B 3/08 30/299 |

FOREIGN PATENT DOCUMENTS

| | | | | |
|---|---|---|---|---|
| FR | 2717042 | A1 * | 9/1995 | A21C 11/12 |
| FR | 2755389 | A1 * | 5/1998 | A21C 11/12 |
| FR | 2768022 | A1 * | 3/1999 | A21C 11/12 |
| FR | 2768023 | A1 * | 3/1999 | A21C 11/12 |
| FR | 2780615 | B1 * | 10/2000 | A21C 11/12 |
| FR | 2841744 | A1 * | 1/2004 | A21C 11/12 |
| FR | 2868914 | A1 | 10/2005 | |
| FR | 2859356 | B1 * | 12/2005 | A21C 11/12 |
| FR | 2844675 | B1 * | 3/2006 | A21C 11/12 |
| FR | 2851422 | B1 * | 9/2006 | A21C 11/12 |
| FR | 2884387 | A1 | 10/2006 | |
| FR | 2950784 | B1 * | 7/2012 | A21C 11/12 |
| FR | 2985414 | B1 * | 7/2014 | A21C 11/12 |
| FR | 3062989 | A1 * | 8/2018 | A21C 11/12 |
| FR | 3066363 | A1 * | 11/2018 | A21C 11/12 |

\* cited by examiner

BREAD LAME

CROSS REFERENCE TO RELATED APPLICATIONS

This application claims priority from and the benefit of U.S. Provisional Application Ser. No. 62/528,637, entitled "BREAD LAME," filed Jul. 5, 2017, which is hereby incorporated by reference in its entirety for all purposes.

BACKGROUND

This disclosure relates to lames, such as bread lames. A lame may be a tool to score bread dough such as sourdough or baguettes, although the inventive techniques disclosed herein are in no way limited to a particular application. Scoring may be used to control the expansion of leavening bread.

SUMMARY

An apparatus and systems are disclosed for a lame, substantially as illustrated by and described in connection with at least one of the figures, as set forth more completely in the claims.

Disclosed example lames include a central portion including a first mating portion; and a first blade holder including a second mating portion, configured to removably engage with the first mating portion; wherein the blade holder is configured to hold a razor having a plurality of corners, such that only one of the corners extends beyond the outer perimeter of the first blade holder when the first blade holder is engaged with the central portion.

In some example lames, the first mating portion and the second mating portion are configured to removably engage via a slot and tongue arrangement. In some example lames, the first mating portion and second mating portion are removably secured together via a male-female connection.

Some example lames further include at least one indicator to indicate a secure engagement between the first mating portion and the second mating portion.

In some example lames, the first blade holder includes a slot for inserting and removing the razor.

In some example lames, the first blade holder includes at least one rail to guide the razor inserted into the slot into position.

In some example lames, the first blade holder is configured to retain the razor in a curved profile.

In some example lames, the first blade holder comprises a first portion and a second portion, and wherein the first portion and the second portion are non-destructively separable.

In some example lames, the first blade holder comprises a first portion and a second portion, and wherein the first portion and the second portion are connected by a hinge.

In some example lames, the central portion comprises a third mating portion, and further comprising a second blade holder including a fourth mating portion configured to removably engage with the third mating portion.

In some example lames, the central portion has a first end and a second end opposite the first end, the first mating portion is positioned at the first end, and the third mating portion mating portion is positioned at the second end. In some example lames, the second blade holder is configured to retain a second razor in a curved profile.

Some example lames further include a cover configured to removably engage the first blade holder to cover an exposed razor corner on the first blade holder. In some example lames, the cover has one of an aperture or a recess. In some example lames, the cover and the first blade holder are removably secured together via a male-female connection.

Disclosed example lames include a first razor having a plurality of corners; a central portion including a first mating portion; and a first blade holder including a second mating portion, configured to removably engage with the first mating portion; wherein the first blade holder is configured to hold the first razor such that only one of the plurality of corners of the first razor extends beyond the outer perimeter of the first blade holder when the first blade holder is engaged with the central portion.

Some example lames further include a second razor having a plurality of corners; and a second blade holder including a fourth mating portion, configured to removably engage with the third mating portion; wherein the second blade holder is configured to hold the second razor such that only one of the plurality of corners of the second razor extends beyond the outer perimeter of the second blade holder when the second blade holder is engaged with the central portion.

In some example lames, the second blade holder is configured to retain the second razor in a curved profile.

Some example lames further include at least one cover configured to cover an exposed razor edge on the first blade holder or the second blade holder.

In some example lames, the central portion has a first end and a second end opposite the first end, the first mating portion positioned at the first end, and the third mating portion mating portion positioned at the second end.

BRIEF DESCRIPTION OF THE DRAWINGS

The figures are not necessarily to scale. Where appropriate, similar or identical reference numbers are used to refer to similar or identical components.

DETAILED DESCRIPTION

Some known lames may have a double edged "safety razor" blade affixed to a relatively long, thin metal pole extending from a handle. The blades may have holes along a center line of the blade. The blades may be flexible so that they can be bent between thumb and forefinger in such a way that the thin pole can be slid through it where the blade then stays in place.

Such lames may suffer from various problems. For example, it may be dangerous to attach the blade; the blade is spring loaded when flexed, and it can become an unpredictable projectile if a finger slips when installing or removing the blade. Further, Slicing bread may require only about a quarter inch of one blade corner. Known lames may leave four corners of the blade exposed at all times, which is three more than necessary. More blade exposure means a higher risk of injury or unintended damage. More blade exposure also means there is more opportunity for unused blade corners and edges to wear and dull before use (for example by placing the tool in a drawer and it rubs against other utensils, etc.).

Further, by having the bottom back blade edge exposed in such lames, the lame may be prone to "catching", whereby when the user makes a slicing motion from front to back, the back blade will catch the dough and drag, creating an undesirable effect. Another disadvantage is that the blade in such known lames may be very loosely attached to the pole, making it easy to dislodge and come off when slicing, or to lose a proper orientation or profile. Another disadvantage is that such lames may only allow for a curved, flexible blade. There are some patterns and bread types for which a straight blade is preferred (as well as some for which a curved blade is preferred).

Another known type of lame is a straight lame, which still requires handling of the blade in a dangerous manner, and may rely on some sort of vice, clamp, or clasp mechanism to hold the blade in place. Blades for straight lames can only be straight. These lames only offer a straight blade option (i.e., no curved blade option).

Some have tried to solve aforementioned problems by implementing a living hinge that: (1) closes onto a safety razor; (2) presses it into a curve shape; and (3) snaps in place. Another attempted solution is to snap the blade in place using the cutout detail located in the center of a blade. A male plastic part may fill this void and a female connector may snap it into place. Within the flexible plastic components is a thin piece of metal that can be bent in to a curve shape by the user. The blade fits into place, and can then be manipulated after the fact to be curved or straight. The plastic may be thin enough to move, and inside is a bendable piece of metal, which can bend and then keeps the entire arm in that shape. In such lames, while the clasp or snap hinge mechanisms may secure the blade in place, these mechanisms may still require the user to handle the blade on the sharp edges to align the grooves and then snap the blade into place. Also, with these mechanisms, the top and bottom edges of the blade remain exposed after it is secured. In some cases, back edge of the blade may "catch" on the dough creating unwanted tears rather than clean score lines.

Another known solution is to permanently fix the blade to the lame. However, such a blade may need to be customized and may not accommodate a standard safety razor blade. Furthermore, the blade may become dull after some time, forcing the user to sharpen the blade rather than using a different leading edge or replacing the blade entirely. Again, the back edge may be exposed which can cause the lame to catch on the dough.

Another known solution is a slot and clamp mechanism that has been used in some lame tools in order to place the blade into position and tighten it down with some freedom when positioning the blade. While placing the blade into a slot and clamping the blade down may allow the user to control the exposure of the blade, this device may only accommodate straight blade profiles, and not curved blade profiles. Furthermore, the user may be required to handle the blade on the sharp bottom edge to slide the top edge in to the handle and secure it in place; such handling of the blade can be unsafe.

The present disclosure overcomes these problems and provides a solution in which the back edge of the lame may not catch on the dough, given that it may only expose one leading edge of the blade. This may be achieved by covering three of the four corners of the blade, rather than the blade being exposed on the top and bottom as in known lames. In addition, only having a certain amount of blade exposed in the blade holder may be safer for the user as it may prevent a user's hand from sliding off the handle and on to the top of the blade.

Further, the present disclosure provides a solution that may incorporate two removable heads (e.g., blade holders); one on each end of the handle. One blade holder may be for a straight blade application, the other for a curved blade application. By incorporating two removable blade holders, the disclosed lame design can achieve both a curved and straight blade profiles as needed for various scoring techniques. Further, the razor blade may be inserted from the back of the blade holder, and then locked into place when the blade holder slides in to the handle. Sliding the blade in from the back of the blade holder prevents the user from handling the sharp edges of the blade and ensures the assembly process is safe. This solution avoids snapping material around the razor blade via a clasp, or tightening the razor blade in place. Once the razor blade is inserted in to the blade holder and then assembled to the handle the razor blade is locked in and may not readily separate from the tool.

The disclosed lame may accommodate readily available double-sided safety razor blades that are commonly available and inexpensive. Further, the razor blade may not be permanently fixed. Given that only one leading edge is exposed, the razor blade can also be rotated around (e.g., manually) when one side becomes dull, thus increasing the longevity of the razor blade. An additional feature is a cover that safely covers the exposed razor blade for storage. This also prevents the blade from becoming dull. The finger loop is a feature that allows the cover to be easily removed and doubles as a hook for a storage solution.

Figure 1A:
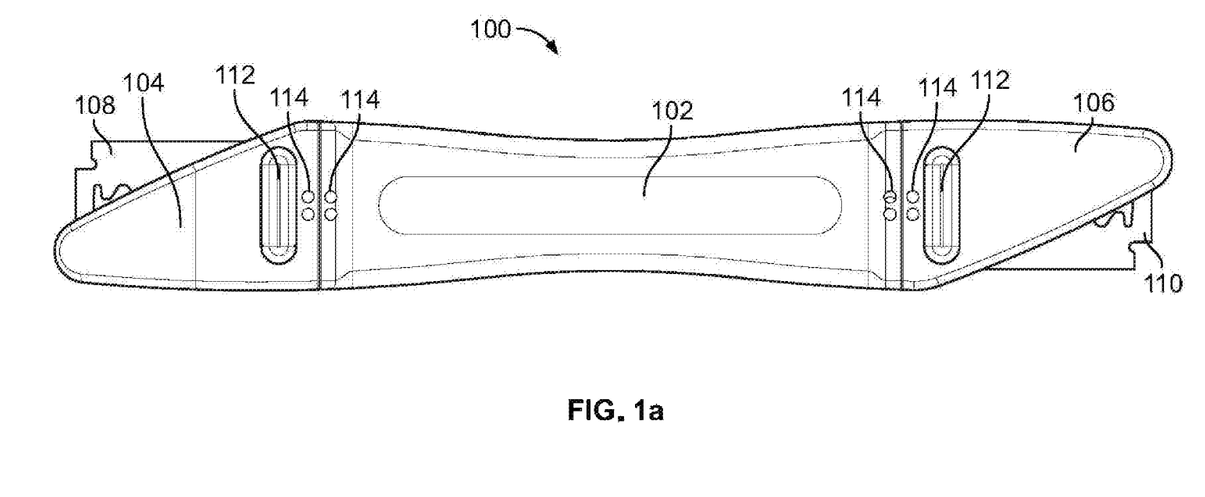
FIG. 1a shows an exemplary lame in accordance with aspects of this disclosure.
Figure 1B:
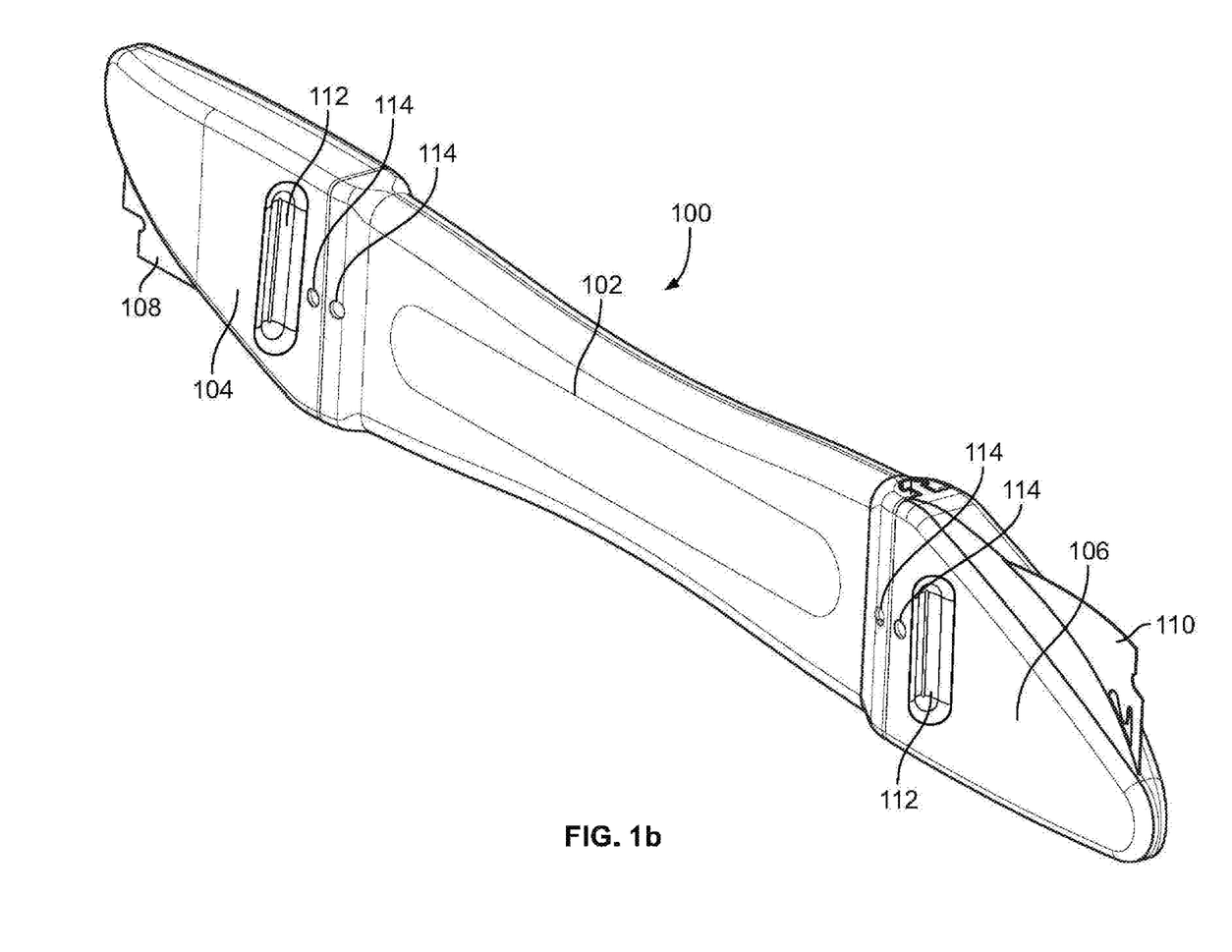
FIG. 1b shows an exemplary lame in accordance with aspects of this disclosure.

FIGS. 1*a* and 1*b* illustrate an exemplary lame 100 in accordance with aspects of this disclosure. The lame 100 has a central portion 102 (which may serve as a handle) which can securely mate with removable blade holders 104 or 106 at either end of the central portion 102. Each removable blade holder 104 and 106 is configured to securely hold a razor blade (108 and 110 respectively). Each razor blade 108 or 110 may have four corners, and the blade holders 104 or 106 may shield three of the four corners within the perimeters of the blade holders 104 or 106. When only one leading edge of the razor blade(s) 108 or 110 is exposed, safety hazards may be reduced, and the back edge of the razor blade may not catch on the dough, as is a problem in other known lames. In some embodiments, the handle 102 may only mate with one blade holder 104 or 106.

Removable blade holders 104 or 106 may hold a razor blade in either a curved or a straight profile, Because the blade holders 104 or 106 are non-destructively removable from the handle 102, different blade profiles (curved or straight) may be applied to the handle. For example, as shown in FIG. 1*b*, blade holder 104 holds razor blade 108 in a straight profile, and blade holder 106 holds razor blade 110 in a curved profile. Each blade holder 104 or 106 may be assembled on either side of the handle 102 (e.g., modular). In some examples, both blade holders 104 or 106 may hold both razor blades 108 or 110 in a straight profile. In some examples, both blade holders 104 or 106 may hold both razor blades 108 or 110 in a curved profile.

As will be described in more detail with reference to FIGS. 2*a*-4, the blade holder(s) 104 or 106 may be configured to engage with and disengage from the handle 102, For example, the blade holder(s) 104 or 106 may have mating portions that may engage with and disengage from corresponding mating portions of the handle 102. For example, the mating portion of blade holder(s) 104 or 106 may include one or more tongue(s) which may slide into and out of a corresponding slot in the mating portion of the handle 102 (or vice versa). Further, the blade holder(s) 104 or 106 may snap in to place (after the tongue(s) are inserted into the corresponding slots), in order to secure the blade holder(s) 104 or 106 to the handle 102, using a snap (e.g., domed snap) feature in which a given blade holder (104 or 106) includes a male protrusion and the handle has a corresponding female recess (or vice versa), The blade holder(s) 104 or 106 may also non-destructively unsnap from the handle 102 and then slide out in order to disengage from the handle 102.

As will be described in more detail with reference to FIG. 5, the lame 100 may be configured to engage with a cover 502 to cover the exposed edge(s) of the razor blade(s) 108 or 110. The blade holder(s) 104 or 106 may have a protrusion 112 to engage with a corresponding recess or aperture 504 on the cover 502. The protrusion 112 may also be used to grip the blade holder(s) 104 or 106 when engaging or disengaging the blade holder(s) 104 or 106 from the handle 102.

The blade holder(s) 104 or 106, and the handle 102 may also include indicators 114 that may be may be used to indicate that the blade holder has been attached correctly to the handle 102. One side of the handle 102 may have two markings (e.g., dots), the other side may have one marking. One side of the blade holder(s) 104 and 106 may have two markings, and the other side may have one marking. For example, FIG. 1*a* shows a first side of the handle 102 and blade holders 104 and 106 with two markings 114 (dots), and FIG. 1*b* shows the other side of the handle 102 and blade holders 104 and 106 with two markings 114 (dots). A user may align the sides with corresponding dots to ensure the blade holder(s) 104 and 106 is attached correctly to the handle 102.

Figure 2A:
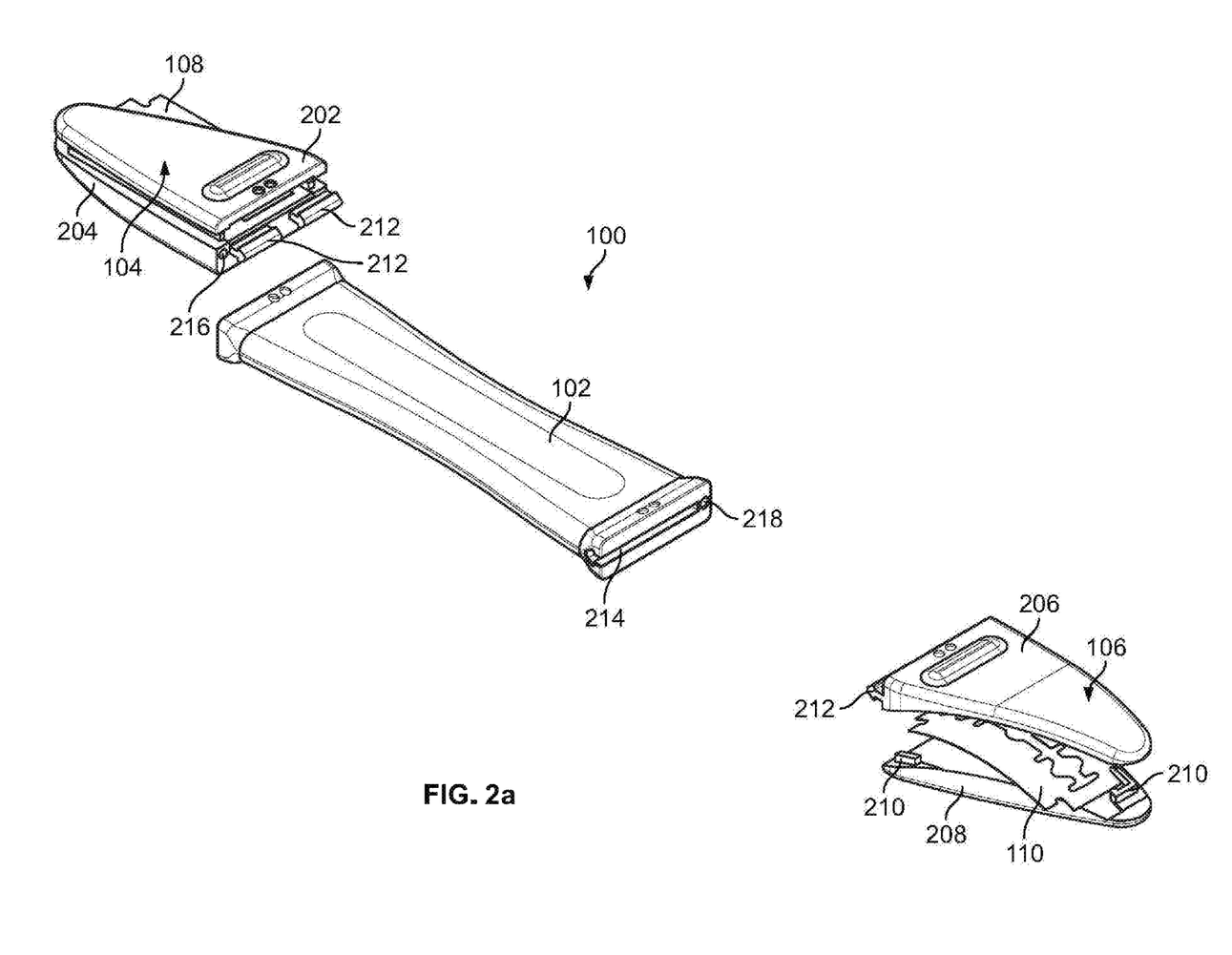
FIG. 2a shows an exploded view of an exemplary lame in accordance with aspects of this disclosure.
Figure 2B:
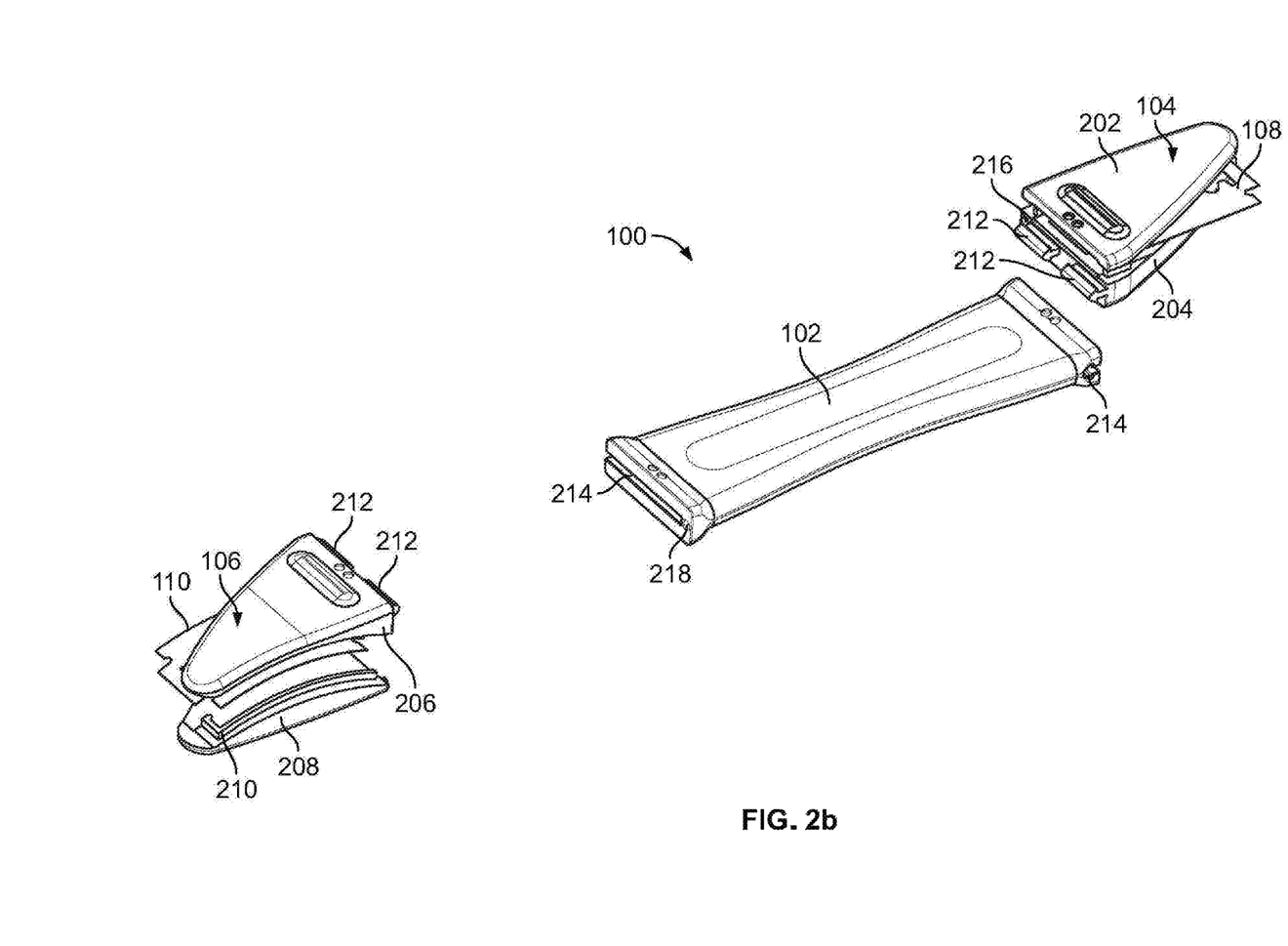
FIG. 2b shows an exploded view of an exemplary lame in accordance with aspects of this disclosure.

FIGS. 2*a* and 2*b* illustrate an exploded view of an exemplary lame 100. In the exemplary lame 100 of FIGS. 2*a* and 2*b*, each blade holder 104 or 106 opens into two portions. For example, straight blade holder 104 may include a first portion 202 and a second portion 204, which when secured together; hold a razor blade 108 in a straight profile. In some examples, the first portion 202 and the second portion 204 may be completely separable, while in some examples, the first portion 202 and the second portion 204 may be connected by a hinge (e.g., a living hinge) or other connecting portions.

As shown in FIGS. 2*a* and 2*b*, curved blade holder 106 may include a first portion 206 and a second portion 208, which when secured together, hold a razor blade 110 in a curved profile. In some examples, the first portion 206 and the second portion 208 may be completely separable, while in some examples, the first portion 206 and the second portion 208 may be connected by a hinge (e.g., a living hinge) or other connecting portions. Each blade holder 104 or 106 may include one or more rails 210 which may guide the razor blades into the proper position. The one or more rails 210 may also hold the razor blades in the proper position.

As shown in FIGS. 2*a* and 2*b*, the blade holders 104 or 106 may have tongue(s) 212 that may slide into a corresponding slot 214 in the handle 102 in order to mate the blade holders 104 and 106 with the handle 102. Other slot and tongue features, or other mating arrangements, may also be used to mate the blade holders 104 or 106 to the handle 102. Further, the blade holders 104 or 106 may snap in to place (after the tongue(s) 212 are inserted into the slots 214) using a snap 216 (e.g., domed snap) feature in which a given blade holder (104 and 106) includes a male protrusion 216 and the handle has a corresponding female recess 218 (or vice versa). The protrusion may have a dome shape and the recess may have a complementary inverted dome shape. Once the blade holder(s) 104 or 106 are snapped in to place, the blade holder(s) 104 and 106 may not readily separate from the handle 102, as may be a problem in some known lames.

As shown in FIGS. 2*a* and 2*b*, the blade holder(s) 104 or 106, and the handle 102 may also include indicators 114 that may be may be used to indicate that the blade holder has been attached correctly to the handle 102. One side of the handle 102 may have two markings, the other side may have one marking, One side of the blade holder(s) 104 and 106 may have two markings, and the other side may have one marking. A user may align the sides with corresponding markings to ensure the blade holder(s) 104 or 106 is attached correctly to the handle 102.

Figure 3:
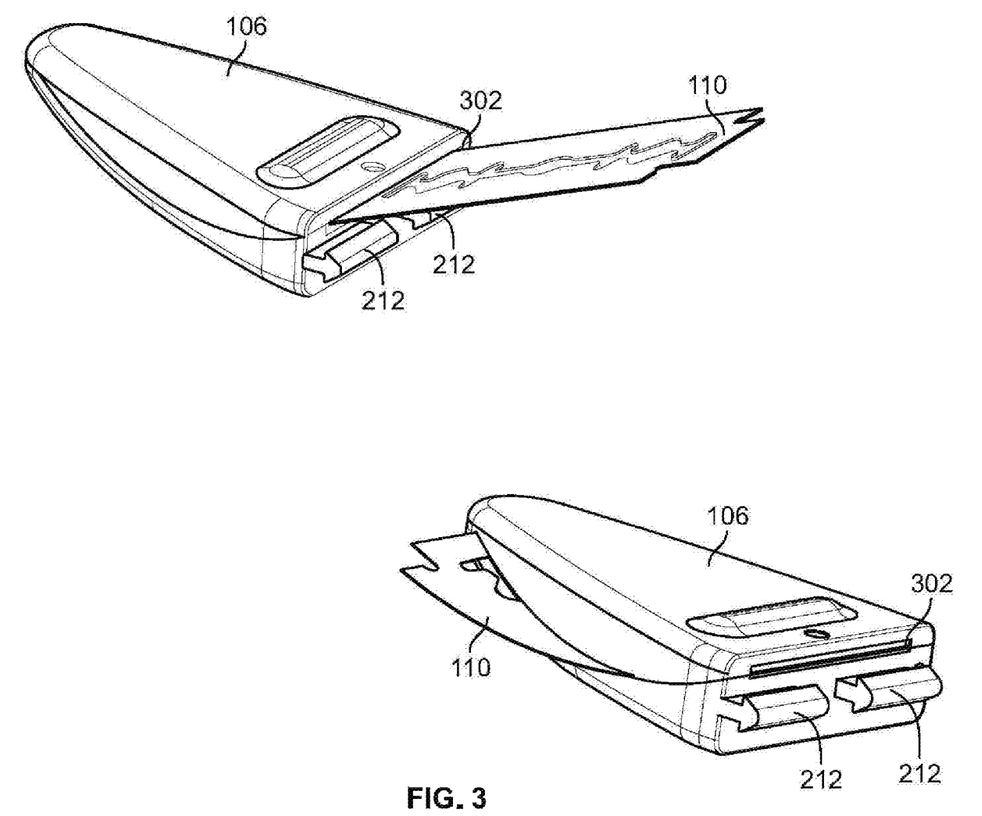
FIG. 3 shows an exploded view of an exemplary lame in accordance with aspects of this disclosure.

In some examples the blade holders 104 or 106 may be permanently secured together, or may be formed of one piece. FIG. 3 shows such an example for a curved blade holder 106. In such examples, the blade holder 106 may include a blade-receiving slot 302. A flexible razor blade 110 may be inserted by a user into the slot 302. Rails inside the blade holder may guide the razor blade 110 into position. The flexible razor blade 110 becomes curved due to the contour in the blade holder 106. A user may also withdraw the razor blade 110 from the blade holder 106.

A straight blade holder 104 may also be permanently secured together, or may be formed of one piece, as is the exemplary curved blade holder 106 of FIG. 3. Such a straight blade holder 104 may also have a slot 302 for receiving and withdrawing a razor blade (not shown). Such a slot system for receiving and withdrawing a razor blade may be advantageous because user has less interaction with the razor blade when inserting/withdrawing the razor blade, whereas in other known lames the user may need to grip the razor blade on the sharp edges and bend the razor blade itself for a curved blade implementation.

Figure 4:
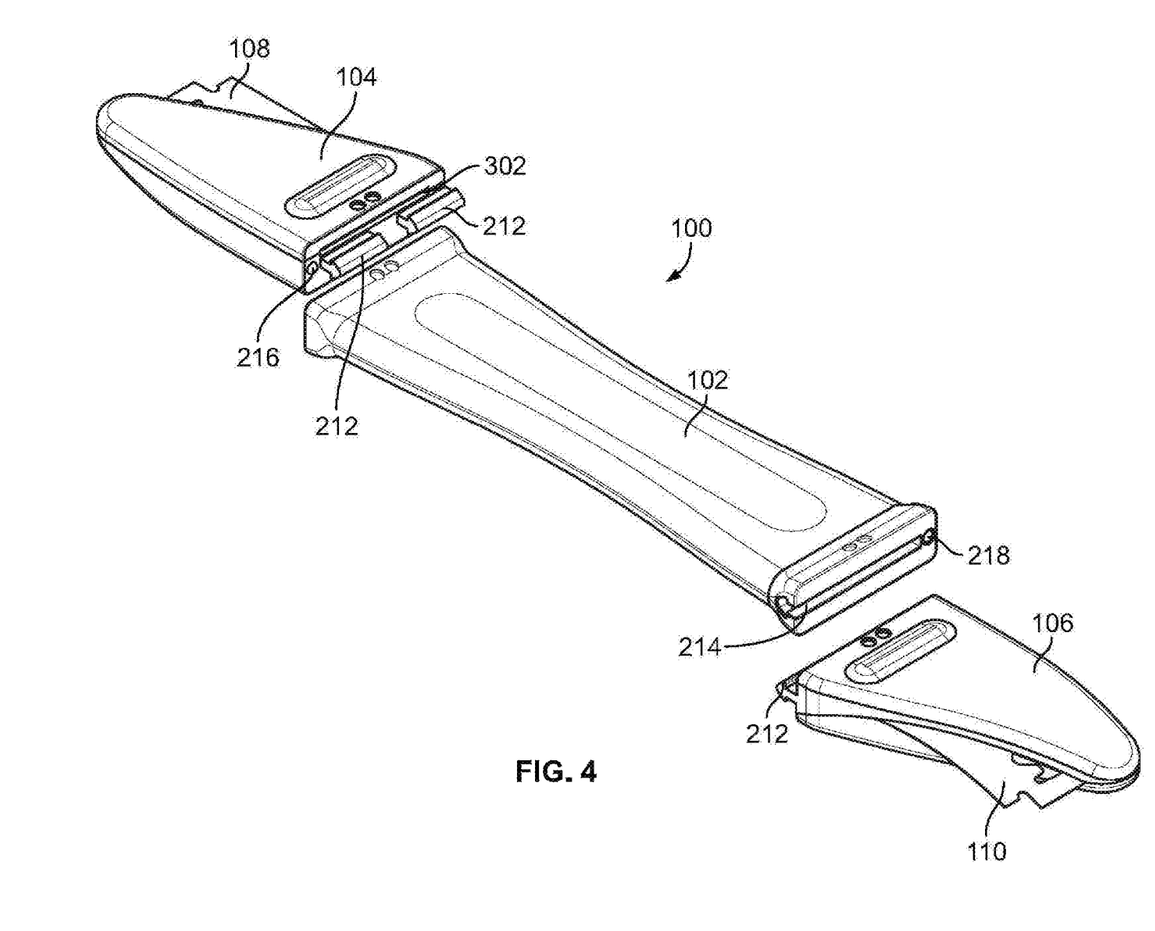
FIG. 4 shows an exemplary blade holder in accordance with aspects of this disclosure.

FIG. 4 illustrates an exploded view of an exemplary lame 100 with blade holders 104 and 106 that are permanently secured together, or formed of one piece. Each blade holder 104 or 106 may include a slot for receiving and withdrawing a respective razor blade 108 or 110.

Figure 5:
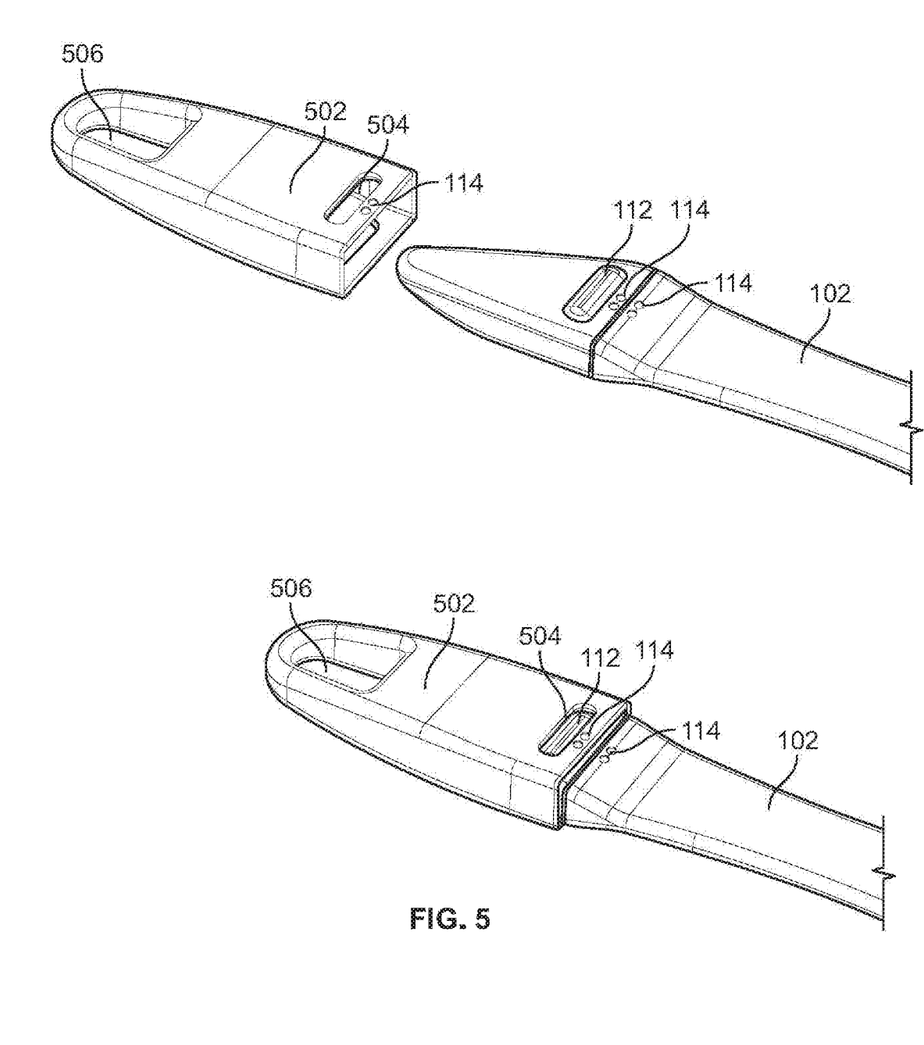
FIG. 5 shows an exemplary cover engaging with an exemplary lame in accordance with aspects of this disclosure.

FIG. 5 illustrates an exemplary cover 502 engaging with an exemplary lame 100. The cover may be useable to cover the straight blade holder 104 and/or the curved blade holder 106. The system may include two covers—one for each blade holder 104 and 106. The cover 302 may include apertures or recesses 504 (on one or both sides—top and bottom) that snap over corresponding protrusions 112 on the blade holder(s) 104 or 106. The cover 502 may include an aperture 506 for hanging on a hook and/or sized to receive a finger for safe removal of the cover 502, The cover 502 may also include indicators 114 that may be may be used to indicate that the cover 502 has been attached correctly to the blade holder(s) 104 or 106 and/or the handle 102. One side of the cover 502 may have two markings, the other side may have one marking. One side of the handle 102 may have two markings, the other side may have one marking. One side of the blade holder(s) 104 or 106 may have two marking, and the other side may have one marking. A user may align the sides with corresponding dots to ensure the cover 502 is attached correctly to the blade holder(s) 104 or 106 and/or the handle 102.

Figure 6A:
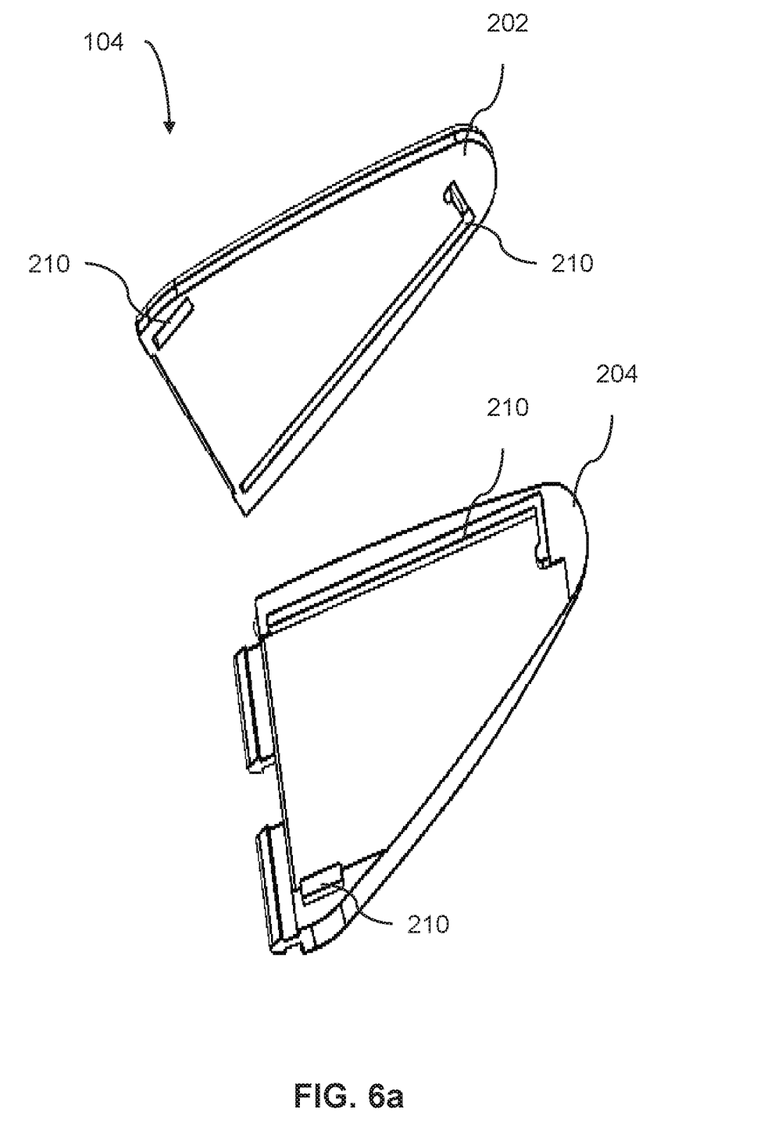
FIG. 6a shows a view of an exemplary blade holder in an open position in accordance with aspects of this disclosure.
Figure 6B:
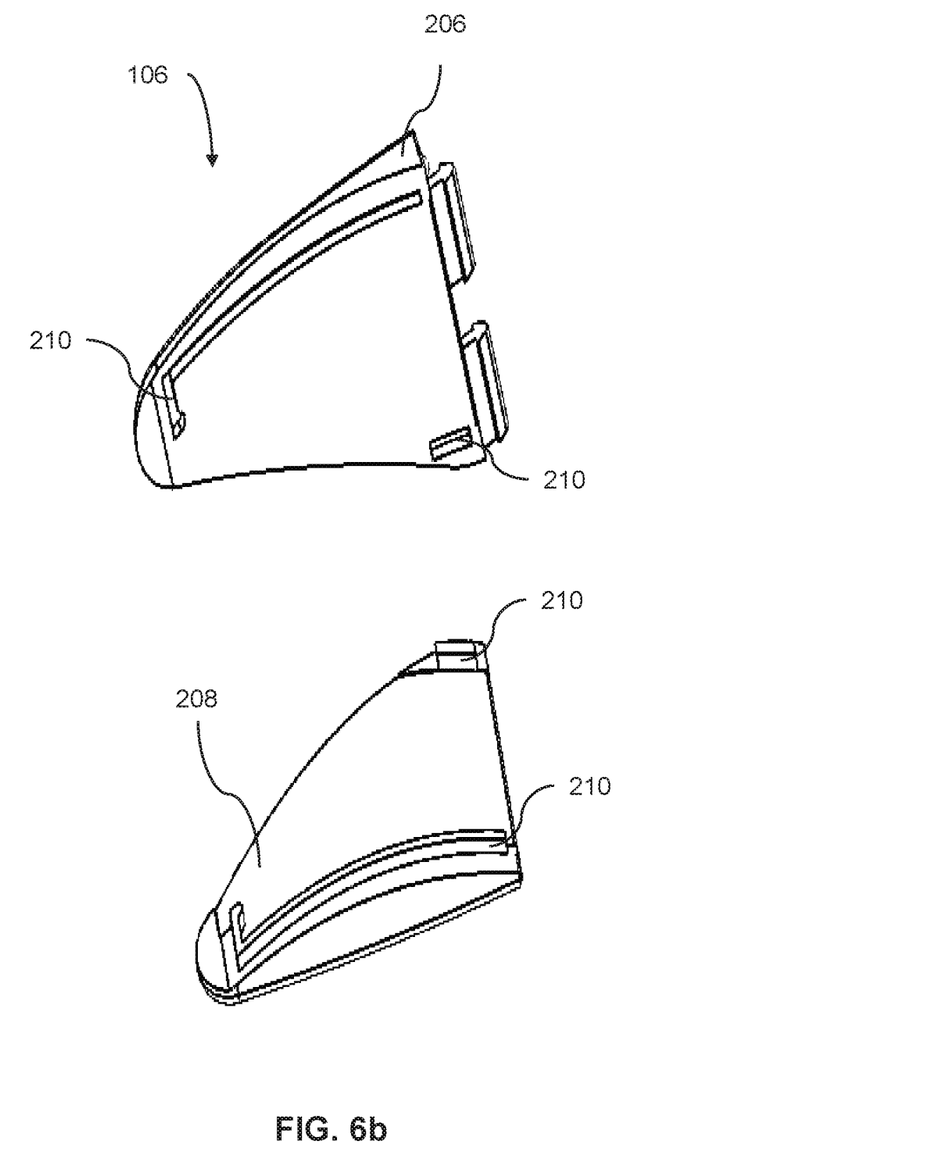
FIG. 6b shows a view of an exemplary blade holder in an open position in accordance with aspects of this disclosure.

FIGS. 6a and 6b illustrate an exploded view of blade holders 104 or 106. FIG. 6a shows an exploded view of a straight blade holder 104, The straight blade holder 104 has a first portion 202 and a second portion 204. In some examples, the first portion 202 and the second portion 204 may be permanently secured together, or may be formed of one piece. In some examples, the first portion 202 and the second portion 204 may be completely non-destructively separable, while in some examples, the first portion 202 and the second portion 204 may be connected by a hinge or the like. The first portion 202 and the second portion 204 may have one or more guides 210 (e.g., raised rails) which guide a razor blade into proper position when a razor blade is inserted into the blade holder 104. The guides 210 also secure the blade in the proper position.

FIG. 6b similarly shows an exploded view of a curved blade holder 106. The curved blade holder 104 has a first portion 206 and a second portion 208. The first portion 206 and the second portion 208 may be permanently secured together, or may be formed of one portion. In some examples, the first portion 206 and the second portion 208 may be completely non-destructively separable, while in some examples, the first portion 206 and the second portion 208 may be connected by a hinge or the like. The first portion 206 and the second portion 208 may have one or more guides 210 (e.g., raised rails) which guide a razor blade into proper curved profile and position when a razor blade is inserted into the blade holder 106. The guide(s) 210 also secure the blade in the proper curved profile and position.

While the present apparatus and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope, Therefore, the present apparatus and/or system are not limited to the particular implementations disclosed, Instead, the present method and/or system will include all implementations falling within the scope of the appended claims, both literally and under the doctrine of equivalents.

What is claimed is:

1. A lame comprising:
   a handle including a first mating portion; and
   a blade holder including a first end comprising a second mating portion and a second end opposite the first end, wherein the first end further includes a blade-receiving slot configured to receive a blade including a plurality of corners, and wherein the second mating portion is configured to removably engage with the first mating portion;
   wherein:
      when the first mating portion is engaged with the second mating portion, the first end of the blade holder is proximate the handle and the second end of the blade holder is distal from the handle; and
      when the blade has been received by the blade-receiving slot, the blade holder is configured to hold the blade, such that only one of the plurality of corners extends beyond an outer perimeter of the blade holder.

2. The lame of claim 1, wherein the first mating portion and the second mating portion define a slot and tongue arrangement.

3. The lame of claim 2, wherein the first mating portion and second mating portion define a male-female connection.

4. The lame of claim 1, wherein at least one of the handle or the blade holder comprises at least one indicator configured to indicate a secure engagement between the first mating portion and the second mating portion.

5. The lame of claim 1, wherein the blade holder includes at least one rail to guide the blade as it is inserted into the blade-receiving slot.

6. The lame of claim 1, wherein the blade holder is configured to retain the blade in a curved profile.

7. The lame of claim 1, wherein the handle comprises a third mating portion, and further comprising a second blade holder including a fourth mating portion configured to removably engage with the third mating portion.

8. The lame of claim 7, wherein the second blade holder is engaged with the handle, the second blade holder comprises an end proximate to the handle and an end distal from the handle, and wherein the end proximate to the handle comprises a second blade-receiving slot configured to receive a second blade.

9. The lame of claim 7, wherein the handle has a first end and a second end opposite the first end, the first mating portion is positioned at the first end, and the third mating portion mating portion is positioned at the second end.

10. The lame of claim 7, wherein the second blade holder is configured to retain a second blade in a curved profile.

11. The lame of claim 1, further comprising a cover configured to removably engage the blade holder to cover the exposed corner of the first blade.

12. The lame of claim 11, wherein the removable engagement between the cover and the blade holder is implemented via a male-female connection.

13. A lame comprising:
    a blade including a plurality of corners;
    a handle including a first mating portion; and
    a blade holder including a first end comprising a second mating portion and a second end opposite the first end, wherein the first end further includes a blade-receiving slot configured to receive the blade, and wherein the second mating portion is configured to removably engage with the first mating portion;
    wherein:
       when the first mating portion is engaged with the second mating portion, the first end of the blade holder is proximate the handle and the second end of the blade holder is distal from the handle; and
       when the blade has been received by the slot, the blade holder is configured to hold the blade such that only one of the plurality of corners of the blade extends beyond an outer perimeter of the blade holder.

14. The lame of claim 13, wherein the handle comprises a third mating portion, the lame further comprising:
    a second blade including a plurality of corners; and
    a second blade holder including a fourth mating portion, configured to removably engage with the third mating portion;
    wherein the second blade holder is configured to hold the second blade such that only one of the plurality of corners of the second blade extends beyond the outer perimeter of the second blade holder.

15. The lame of claim 14, wherein the second blade holder is configured to retain the second blade in a curved profile.

16. The lame of claim 14, further comprising at least one cover configured to cover the exposed blade corner on the blade holder or the second blade holder.

17. The lame of claim 14, wherein the handle includes a first end and a second end opposite the first end, wherein the first mating portion is positioned at the first end, and wherein the third mating portion is positioned at the second end.

18. The lame of claim 14, wherein the second blade holder is engaged with the handle, the second blade holder comprises an end proximate to the handle and an end distal from the handle, and wherein the end proximate to the handle comprises a second blade-receiving slot configured to receive the second blade.

* * * * *